United States Patent Office 2,855,411
Patented Oct. 7, 1958

2,855,411

16-HALOGEN ESTRONE ETHERS AND ESTERS

George P. Mueller, Park Ridge Ill., assignor to G. D. Searle & Co., Chicago, Ill., a corporation of Delaware No Drawing. Application November 29, 1957
Serial No. 699,446

8 Claims. (Cl. 260—397.4)

The present invention relates to 16-chloro- and 16-fluoroestrone, ethers and esters thereof. The compounds of the present invention can be represented by the structural formula

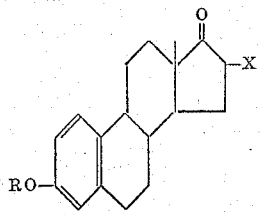

wherein X is a halogen selected from the group consisting of chlorine and fluorine, and R can be selected from the group of radicals consisting of hydrogen, lower alkyl and lower alkanoyl. Lower alkyl radicals which R can represent include methyl, ethyl, propyl, butyl, amyl, hexyl, heptyl, octyl, and branched-chain isomers of the foregoing. Among the lower alkanoyl radicals which R can represent are particularly the acyl radicals of carboxylic acids such as acetyl, propionyl, butyryl, isobutyryl, valeryl, isovaleryl, hexanoyl, heptanoyl, and octanoyl.

The 16-chloroestrone derivatives of the present invention can be prepared by treating an appropriate ether or ester of estrone enol (lower) alkanoate with chlorine in an inert solvent such as carbon tetrachloride, destroying the excess chlorine and isolating the product. As a specific example, reaction of estrone enol acetate 3-methyl ether with chlorine in carbon tetrachloride solution followed by destruction of excess chlorine with sodium bisulfite and isolation of the product affords 16-chloroestrone 3-methyl ether.

Suitable estrone 3-lower alkyl ethers as initial starting materials can be made by refluxing estrone with the desired alkyl iodide and an acid binding agent such as potassium carbonate in alcoholic solution, filtering, evaporating the filtrate to dryness, collecting and purifying the product. The resulting estrone 3-alkyl ether is then converted to an estrone enol acylate 3-alkyl ether. For example, the enol acetate can be made by distilling the estrone 3-alkyl ether with isopropenyl acetate and p-toluene-sulfonic acid and isolating the product.

Suitable estrone enol diacylates can be prepared by heating estrone at about 150° for about 4 hours with the desired alkanoyl anhydride and p-toluenesulfonic acid and recovering the product.

The 16-fluoroestrone compounds of the present invention can be made by treating the corresponding 16-iodo compound with silver fluoride in a solvent such as acetonitrile. After the reaction is complete, the precipitated silver salts are removed, the solvent removed in vacuo and the product collected and purified.

The 16-iodoestrone and its 3-(lower)alkyl ethers and 3-(lower)alkanoyl esters can be prepared by treating an ether or an ester of estrone enol (lower) alkanoate with an iodinating agent such as N-iodosuccinimide or iodine, destroying the excess iodinating agent and isolating the product. As a specific example, reaction of estrone enol acetate 3-methyl ether with N-iodosuccinimide in dioxane solution followed by destruction of excess iodine with sodium thiosulfate and isolation of the product affords 16-iodoestrone 3-methyl ether. The same compound is obtained by the use of iodine in carbon tetrachloride solution.

The processes by which the compounds of the invention are made can lead to the formation of stereoisomeric products. Although both possible stereoisomers are formed, in actual practice it is found that one of the stereoisomers predominates, and that upon subjecting the crude reaction product to recrystallization, the crystalline product obtained consists substantially of a single stereoisomer. A determination of the stereochemical configuration of the predominant isomer is not necessary in the identification of the compounds or in employing the claimed compositions in their intended applications.

The compounds of the present invention have valuable pharmacological properties. Broadly, their usefulness can be said to result from the fact that they exhibit certain of the biological characteristics which are associated with the natural estrogenic hormones, while at the same time they exhibit remarkably little estrogenic activity. It is well known that certain applications of estrogenic hormones such as estrone and estradiol are limited and in many cases made entirely impractical because of the estrogenic effects they produce. One of these applications is in the treatment of degenerative diseases associated with abnormal cholesterol metabolism and deposition. It is recognized that estrogenic hormones exhibit an inhibitory and consequently beneficial effect on the arterial deposition of cholesterol, and it is widely agreed that this so-called anti-atherogenic effect is achieved by a reduction in the serum ratio of cholesterol to phospholipids. This result is commonly, but not necessarily, accompanied both by a reduction in the serum concentration of cholesterol and an increase in the serum concentration of phospholipids. The reduction in the serum ratio of cholesterol to phospholipids can be designated as a "lipid effect" and regarded as a measure of anti-atherogenic activity; and for any particular compound quantitative comparisons can be made between this effect and the estrogenic effect associated therewith. It has been found that in the compositions of the present invention the ratio of the lipid effect to the estrogenic effect has been markedly increased over the corresponding ratios which are characteristic of the natural estrogenic hormones. For example, 16-chloroestrone 3-methyl ether exhibits 82% of the lipodiatic effect of estrone in the chicken while exhibiting 0.8% of the estrogenic activity of estrone as measured by the mouse uterine assay. Thus, the ratio of lipodiatic activity to estrogenic activity as compared to the same ratio for estrone is as 100 to 1.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight and in parts by volume. Parts by weight bear the same relation to parts by volume as kilograms to liters.

*Example 1*

A mixture of 3.26 parts by weight of estrone enol acetate 3-methyl ether, 2.5 parts by weight of N-iodosuccinimide and 5 parts by volume of purified dioxane is placed in a reaction vessel, the air displaced with nitrogen, the reaction vessel closed and the contents dissolved by warming and stirring. After all has dissolved, the mixture is heated at 80° for 1.5 hours and then diluted with 20 parts by volume of methanol followed by a concentrated aqueous solution containing 3.3 parts by weight of potassium iodide whereupon the reaction mixture solidifies. An aqueous solution containing 2.48 parts by weight of sodium thiosulfate is added and the mixture cooled in ice with shaking. The reaction product is filtered, washed with water and dissolved in 250 parts by volume of boiling methanol. The methanolic solution is filtered, chilled, the crystalline residue filtered and crystallized once more from 150 parts by volume of methanol to yield irregular plates of 16-iodoestrone 3-methyl ether; melting point 161–166°; $[\alpha]_D = +89.7°$ (0.93% in chloroform).

Five parts by weight of 16-iodoestrone 3-methyl ether is dissolved in 130 parts by volume of acetonitrile and the solution refluxed for 16 hours in a Soxhlet apparatus containing 25 parts by weight of silver fluoride. The mixture is cooled to room temperature, filtered from the suspended silver iodide, diluted with 2 volumes of chloroform, the resulting solution washed thoroughly with water and dried over magnesium sulfate. The magnesium sulfate is filtered off and the filtrate evaporated in vacuo to dryness. The oily residue is dissolved in 20 parts by volume of benzene and 40 parts by volume of petroleum ether and chromatographed over a column of 25 parts by weight of magnesium silicate (known as Florisil). The colume is eluted with 700 parts by volume of benzene and the resulting eluate concentrated in vacuo to an oily crystalline residue. The residue in 50% benzene-petroleum ether is chromatographed over a column of 100 parts by weight of silica gel and eluted with 2000 parts by volume of 75% benzene in petroleum ether. The eluate is evaporated to dryness and the residue crystallized successively from benzene-petroleum ether and from ethanol to give 16-fluoroestrone 3-methyl ether in the form of irregular heavy needles; melting point 166–169°; $[\alpha]_D = +157°$ (chloroform).

*Example 2*

Seven parts by weight of estrone enol diacetate is dissolved with warming in 20 parts by volume of dioxane and, under a nitrogen atmosphere, treated with 5 parts by weight of N-iodosuccinimide for 3 hours at 65°. The reaction mixture is chilled in ice, 3.3 parts by weight of potassium iodide in concentrated aqueous solution added followed by 5 parts by weight of sodium thiosulfate as an aqueous solution. The reaction mixture is diluted with 200 parts by volume of water and extracted successively with 4 portions of 75 parts by volume of chloroform. The chloroform extracts are combined, washed twice with water and dried over magnesium sulfate. After concentration to dryness, the oil remaining is dissolved in 100 parts by volume of ether followed by concentration to 30 parts by volume and allowed to stand for crystallization. The crystalline residue is dissolved in 35 parts by volume of methanol, chilled and the crystalline residue again crystallized from 30 parts by volume of methanol. The crystals thus obtained are dissolved in 10 parts by volume of benzene to which is added 25 parts by volume of cyclohexane, the mixture warmed and allowed to stand. The crystals thus obtained are filtered off, dissolved in 100 parts by volume of ether and concentrated to beginning crystallization. A final recrystallization from ether as described before yields 16-iodoestrone 3-acetate; melting point 142–143.6°; $[\alpha]_D = +82°$ (chloroform).

A mixture of 130 parts by volume of acetonitrile, 3.5 parts by weight of 16-iodoestrone 3-acetate and 10 parts by weight of silver fluoride is heated on the steam bath for three hours, left to stand for three days and then heated to boiling and filtered. The filtrate is diluted with ether, washed thoroughly with water and the ether phase separated, dried and evaporated leaving a brown oil. The latter is heated for 30 minutes with 20 parts by volume of acetic anhydride. The excess acetic anhydride is removed in vacuo and the residue, dissolved in a mixture of 50 parts by volume of benzene and 30 parts by volume of petroleum ether, is chromatographed on 100 parts by weight of silica gel. The column is washed with 3000 parts by volume of benzene and eluted with 500 parts by volume of 5% ethyl acetate in benzene. The eluate is evaporated to dryness; the residue is dissolved in 40 parts by volume of ether, concentrated to 20 parts by volume and chilled overnight. The resulting precipitate is collected and recrystallized four times from hot benzene to which is added normal pentane to yield 16-fluoroestrone 3-acetate; melting point 182–184°; $[\alpha]_D = +145°$ (chloroform).

*Example 3*

A solution of 0.43 parts by weight of chlorine gas dissolved in 6 parts by volume of carbon tetrachloride is added to a solution of 2 parts by weight of estrone enol acetate 3-methyl ether in 20 parts by volume of carbon tetrachloride containing a suspension of 1 part by weight of finely-ground anhydrous potassium carbonate. While the addition is being made the suspension is cooled in ice with vigorous stirring. After addition is complete the mixture is treated with 1 part by weight of sodium bisulfite dissolved in a minimum quantity of water, diluted with water and extracted with chloroform. The chloroform solution is dried over magnesium sulfate and concentrated in vacuo. The oily residue remaining is dissolved in a small amount of chloroform, the resulting solution treated with 100 parts by volume of methanol, and azeotropically distilled until the chloroform is removed. Crystallization occurs while the solution is being concentrated. The mixture is cooled and the crystalline residue collected and crystallized twice from 10 parts by volume of chloroform to which 100 parts by volume of methanol is added as before. The product thus obtained is 16-chloroestrone 3-methyl ether; melting point 175–179°; $[\alpha]_D = +160°$ (chloroform).

*Example 4*

Five parts by weight of estrone 3-ethyl ether dissolved in 200 parts by volume of isopropenyl acetate containing 2.5 parts by weight of p-toluenesulfonic acid monohydrate is heated with slow distillation for 20 hours. The undistilled material remaining is chilled in ice and diluted with 250 parts by volume of cold ether.

The resulting solution is extracted successively with three 100 parts-by-volume portions of cold aqueous sodium bicarbonate solution. The ether solution is dried over magnesium sulfate, and distilled to dryness in vacuo. The residue is dissolved in 500 parts by volume of hot cyclohexane and chromatographed over 50 parts by weight of magnesium silicate suspended in cyclohexane. The column is eluted with 500 parts by volume of cyclohexane. The collected eluates are concentrated to 150 parts by volume and allowed to stand. The crystals of estrone enol acetate 3-ethyl ether are collected; melting point 107–108°.

3.4 parts by weight of estrone enol acetate 3-ethyl ether is dissolved in 100 parts by volume of carbon tetrachloride containing 20 parts by weight of finely powdered anhydrous potassium carbonate. The suspension is maintained at 6–12°, stirred, and treated during 20 minutes with 0.81 part by weight of chlorine dissolved in 16 parts by volume of carbon tetrachloride. A cold solution of 20 parts by weight of sodium thiosulfate and 100 parts by volume of water is added. The mixture is treated with chloroform and the organic layer separated, washed with water and dried over anhydrous magnesium sulfate. Evaporation of the solvent and addition of methanol yield a crystalline product which is redissolved in 300 parts by volume of boiling methanol, then concentrated to 175 parts by volume and allowed to stand.

The resulting crystals are collected and recrystallized once from methanol to yield 16-chloroestrone 3-ethyl ether; melting point 164.5–166.8°; [α]_D = +153.5° (chloroform).

*Example 5*

A solution of 3.54 parts by weight of estrone enol diacetate in 125 parts by volume of carbon tetrachloride containing 25 parts by weight of anhydrous potassium carbonate is treated with 15.2 parts by volume of 0.727 molar chlorine in carbon tetrachloride. The mixture is stirred while maintaining the temperature at about 12° during the addition, which requires about 30 minutes. A solution of 20 parts by weight of sodium thiosulfate in cold water is added and the organic layer is separated and washed with water. It is then dried over anhydrous magnesium sulfate, filtered and the solvent distilled. The residue is dissolved in 40 parts by volume of acetone to which is added 40 parts by volume of pentane and the solution allowed to stand. The crystals which separate are collected and recrystallized once from 60 parts by volume of methanol to yield 16-chloroestrone 3-acetate; melting point 163–166°; [α]_D = +150° (chloroform).

*Example 6*

A combination of 18.2 parts by weight of estrone, 500 parts by volume of ethanol, 40 parts by weight of potassium carbonate and 100 parts by volume of normal propyl iodide is stirred under reflux for 4 hours, then concentrated to ½ volume, cooled and filtered. The filtered solution is distilled to dryness and the residue dissolved in a mixture of water and methylene chloride. The organic layer is separated, washed with water, distilled to dryness and the residue recrystallized twice from methanol to yield estrone 3-n-propyl ether; melting point 98–99°.

By substituting stoichiometric quantities of isopropyl iodide for the normal propyl iodide and otherwise following the procedure described, estrone 3-isopropyl ether is obtained which after crystallization from methanol melts at 154–155°.

In the same manner by substituting stoichiometric quantities of n-butyl iodide, estrone 3-n-butyl ether is obtained, melting at 106–107°.

A mixture of 10 parts by weight of estrone n-propyl ether, 200 parts by volume of isopropenyl acetate and one part by weight of p-toluenesulfonic acid monohydrate is distilled slowly during 19 hours. The solution is chilled, diluted with cold ether and washed with an excess of cold aqueous sodium bicarbonate solution. After drying and filtering, the ethereal solution is distilled to dryness and the residue dissolved in petroleum ether for chromatography on 30 parts by weight of magnesium aluminum silicate sold under the brand name Florex. After eluting with 500 parts by volume of petroleum ether, the combined eluates are concentrated to 50 parts by volume and the crystals separating on standing are collected to yield estrone enol acetate 3-n-propyl ether; melting point 98–99°.

4.5 parts by weight of estrone enol acetate 3-n-propyl ether in 300 parts by volume of carbon tetrachloride maintained at 5 to 10° is treated with vigorous stirring with 20 parts by weight of anhydrous potassium carbonate followed by 15.2 parts by volume of 0.70 molar chlorine in carbon tetrachloride solution. The addition is complete after 15 minutes, the mixture is poured into an excess of cold aqueous sodium thiosulfate and extracted with chloroform. The organic solution is washed with water, dried over anhydrous magnesium sulfate, filtered and distilled to dryness. Recrystallization from acetone-petroleum ether mixtures yields 16-chloroestrone 3-n-propyl ether; melting point 140–142°; [α]_D = +148.6° (chloroform).

By substituting equivalent quantities of estrone 3-isopropyl ether or estrone 3-n-butyl ether and otherwise proceeding according to the herein described processes, 16-chloroestrone 3-isopropyl ether and 16-chloroestrone 3-n-butyl ether, respectively, are obtained.

*Example 7*

A solution of 1.1 parts by weight of 16-chloroestrone 3-acetate and 20 parts by volume of glacial acetic acid is heated on the steam bath while 10 parts by volume of water is added slowly so that crystallization does not occur. After heating overnight the solution is allowed to come to room temperature slowly, the crystals separating are collected and recrystallized several times from mixtures of acetone-water and acetone-petroleum ether. The 16-chloroestrone so obtained melts at 238.5 to 240.5°; [α]_D = +166° (chloroform).

*Example 8*

A mixture of 3.5 parts by weight of estroneisobutyrate, 10 parts by weight of isobutyric anhydride and 0.5 parts by weight of p-toluenesulfonic acid monohydrate is slowly distilled to one-half volume over a 6-hour period. The reaction mixture is cooled and 100 parts by weight of crushed ice added. The mixture is extracted with 200 parts by volume of ether and the ether extract washed with ice cold sodium bicarbonate solution until neutral. The ether solution is dried over anhydrous magnesium sulfate, filtered and the solvent removed in vacuo to yield estrone enol diisobutyrate.

A solution of 0.8 parts by weight of chlorine gas dissolved in 12 parts by volume of carbon tetrachloride is added to a solution of 4.1 parts by weight of estrone enol diisobutyrate in 40 parts by volume of carbon tetrachloride containing a suspension of 2 parts by weight of finely-ground anhydrous potassium carbonate. While the addition is being made the suspension is cooled in ice with vigorous stirring. After addition is complete the mixture is treated with 2 parts by weight of sodium bisulfite dissolved in a minimum quantity of water, diluted with water and extracted with chloroform. The chloroform solution is dried over magnesium sulfate and concentrated in vacuo. The oily residue remaining is dissolved in a small amount of chloroform, the resulting solution treated with 150 parts by volume of methanol and concentrated to 75 parts by volume. Crystallization occurs while the solution is being concentrated. The solution is cooled and the crystalline residue collected and crystallized twice from 15 parts by volume of chloroform to which 150 parts by volume of methanol is added and concentrated as before. The product thus obtained is 16-chloroestrone 3-isobutyrate.

What is claimed is:
1. 16-haloestrone derivatives of the formula

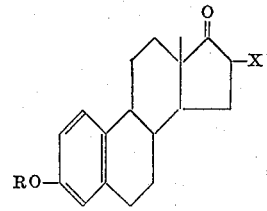

wherein X represents a halogen selected from the group consisting of chlorine and fluorine and R represents a radical selected from the group consisting of hydrogen, lower alkyl and lower alkanoyl.
2. 16-fluoroestrone 3-methyl ether.
3. 16-fluoroestrone 3-acetate.
4. 16-chloroestrone 3-methyl ether.
5. 16-chloroestrone 3-ethyl ether.
6. 16-chloroestrone 3-acetate.
7. 16-chloroestrone 3-n-propyl ether.
8. 16-chloroestrone.

No references cited.